US012592524B2

(12) United States Patent
Li et al.

(10) Patent No.: US 12,592,524 B2
(45) Date of Patent: Mar. 31, 2026

(54) CONNECTOR AND ELECTRONIC DEVICE

(71) Applicant: HUAWEI TECHNOLOGIES CO., LTD., Shenzhen (CN)

(72) Inventors: Beijun Li, Shenzhen (CN); Xuecong Liu, Dongguan (CN); Juwang Zhang, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 263 days.

(21) Appl. No.: 18/230,799

(22) Filed: Aug. 7, 2023

(65) Prior Publication Data

US 2023/0378699 A1 Nov. 23, 2023

Related U.S. Application Data

(63) Continuation of application No. PCT/CN2021/132497, filed on Nov. 23, 2021.

(30) Foreign Application Priority Data

Feb. 8, 2021 (CN) ........................ 202120356789.X

(51) Int. Cl.
*H01R 12/79* (2011.01)
*H01R 12/71* (2011.01)
*H01R 13/6596* (2011.01)

(52) U.S. Cl.
CPC ....... *H01R 13/6596* (2013.01); *H01R 12/714* (2013.01); *H01R 12/79* (2013.01)

(58) Field of Classification Search
CPC .... H01R 12/714; H01R 12/724; H01R 12/79; H01R 13/6461; H01R 13/6471; H01R 13/6596; H01R 13/6597
See application file for complete search history.

(56) References Cited

U.S. PATENT DOCUMENTS 7,621,760 B1 * 11/2009 Barr ................... H01R 13/6585 439/607.05
9,136,648 B2 * 9/2015 Molnar ................ H01R 9/2691
(Continued)

FOREIGN PATENT DOCUMENTS

CN 204947248 U 1/2016
JP 2007141587 A 6/2007
(Continued)

*Primary Examiner* — Abdullah A Riyami
*Assistant Examiner* — Thang H Nguyen
(74) *Attorney, Agent, or Firm* — WOMBLE BOND DICKINSON (US) LLP

(57) ABSTRACT

This application relates to a connector, including a plurality of transmission lines and at least one shielding sheet. The plurality of transmission lines are arranged at an interval in a first direction. An extension direction of each transmission line intersects with the first direction. The plurality of transmission lines include at least one ground pin. The shielding sheet is electrically conductive, and includes a main body part, at least one first support foot, and at least one second support foot. The main body part extends along the first direction, and spans the plurality of transmission lines from one side of the transmission lines to the other side of the transmission lines. The first support foot and the second support foot are respectively disposed on two sides of the main body part. The first support foot and the second support foot are separately connected to the ground pin fixedly.

20 Claims, 13 Drawing Sheets

(56) References Cited

U.S. PATENT DOCUMENTS

| | | | | |
|---|---|---|---|---|
| 9,306,304 | B2 * | 4/2016 | Chen | H01R 12/79 |
| 10,498,091 | B2 * | 12/2019 | Xu | H01R 13/6597 |
| 12,237,622 | B2 * | 2/2025 | Li | H05K 9/0024 |
| 2010/0022130 | A1 * | 1/2010 | Barr | H01R 13/6471 439/607.09 |
| 2016/0352050 | A1 * | 12/2016 | Hu | H01R 13/652 |
| 2019/0296498 | A1 * | 9/2019 | Jin | H01R 13/502 |
| 2020/0244014 | A1 * | 7/2020 | Lin | H01R 13/6471 |

FOREIGN PATENT DOCUMENTS

| | | | |
|---|---|---|---|
| JP | 2012054173 | A | 3/2012 |
| JP | 2013243122 | A | 12/2013 |
| JP | 2019215969 | A | 12/2019 |

* cited by examiner

CONNECTOR AND ELECTRONIC DEVICE

CROSS-REFERENCE TO RELATED APPLICATIONS

This application is a continuation of International Application No. PCT/CN2021/132497, filed on Nov. 23, 2021, which claims priority to Chinese Patent Application No. 202120356789.X, filed on Feb. 8, 2021. The disclosures of the aforementioned applications are hereby incorporated by reference in their entireties.

TECHNICAL FIELD

This application relates to the field of electronic devices, and in particular, to a connector and an electronic device provided with the connector.

BACKGROUND

A connector is an apparatus that connects electrical terminals to form a circuit. With connectors, connections between wires, cables, printed circuit boards, and electronic elements can be implemented, and data, electric power, and signals can be transmitted. Usually, a metallic shielding sheet or a conductive plastic is used in a connector to prevent signal current reference return and isolate signal crosstalk. However, electric conductivity of a conductive plastic is comparatively low, and a signal crosstalk avoidance effect thereof is poor for a high-speed connector. A metallic shielding sheet implements signal current reference return in a suspension grounding manner. However, a suspension grounding structure is usually in an open-circuit form, which causes a low-band signal to form crosstalk resonance, and a crosstalk risk is also caused when a transmission rate is 28 Gb/s or above.

SUMMARY

An objective of this application is to provide a connector, so as to improve an anti-crosstalk capability of a connector by improving a suspension grounding structure. In addition, this application further relates to an electronic device provided with the connector.

According to a first aspect, this application relates to a connector, including a plurality of transmission lines and at least one shielding sheet, where an extension direction of each transmission line intersects with a first direction, and the plurality of transmission lines include at least one ground pin; and the shielding sheet is electrically conductive, the shielding sheet includes a main body part, at least one first support foot, and at least one second support foot, the main body part extends along the first direction and spans the plurality of transmission lines from one side of the transmission lines to the other side of the transmission lines, the first support foot and the second support foot are respectively disposed on two sides of the main body part, the first support foot is fastened to the ground pin, the second support foot is also fastened to the ground pin, and the main body part is spaced apart from the plurality of transmission lines.

In this application, the connector implements signal transmission by using the plurality of parallel transmission lines arranged at an interval, and the at least one ground pin is disposed in the plurality of transmission lines to provide a basic potential of a transmitted signal. In this application, the connector further prevents signal crosstalk by using the disposed shielding sheet. The shielding sheet is electrically connected to the ground pin through the first support foot and the second support foot that are respectively disposed on the two sides of the main body part, so that the shielding sheet can form, for the ground pin, an electrical path passing through the main body part. In a process of signal transmission through the plurality of transmission lines, the electrical path passing through the main body part can effectively prevent a signal current reference return phenomenon, thereby avoiding crosstalk resonance impact of a low-band signal, so that signal transmission integrity of the connector is improved.

In an embodiment, a quantity of first support feet, a quantity of second support feet, and a quantity of ground pins are the same, and each ground pin is electrically connected to one first support foot and one second support foot.

For example, the first support foot and the second support foot respectively disposed on the two sides of the main body part are electrically connected to a same ground pin, so that an electrical length of each ground pin for implementing current return in the shielding sheet can be shortened, thereby reducing an inductance effect formed by the shielding sheet for each ground pin.

In an embodiment, each of the first support foot and the second support foot is disposed parallel to the extension direction of the transmission line.

For example, the first support foot is disposed parallel to the extension direction of the transmission line, that is, the first support foot is disposed parallel to the ground pin electrically connected to the first support foot, so that a length of the first support foot is reduced, which helps reduce an inductance effect formed by the shielding sheet for the ground pin; and the second support foot is also disposed parallel to the extension direction of the transmission line, so that a length of the second support foot can also be reduced, thereby reducing an inductance effect formed by the shielding sheet for the ground pin.

In an embodiment, the plurality of transmission lines all extend along a second direction, and the second direction is perpendicular to the first direction.

For example, because the main body part spans the plurality of transmission lines, when a length direction of the main body part is perpendicular to the extension direction of the plurality of transmission lines, a length size of the main body part is smallest, and an inductance effect formed for each transmission line is also correspondingly reduced.

In an embodiment, the plurality of transmission lines further include a plurality of signal pins, the at least one ground pin includes two side ground pins, the two side ground pins are arranged at an interval, and all of the signal pins are arranged between the two side ground pins.

For example, a structure of the two side ground pins is disposed, and the two side ground pins are respectively disposed at outermost edges of the plurality of transmission lines arranged parallel, so that signal crosstalk on the two sides of the plurality of transmission lines can be effectively shielded, thereby ensuring integrity of a signal transmitted through the signal pin located between the two side ground pins.

In an embodiment, the at least one ground pin further includes a plurality of intermediate ground pins, the intermediate ground pins are arranged at an interval in the plurality of signal pins, and at least one signal pin is disposed between any two adjacent ground pins.

For example, with the intermediate ground pins disposed, a signal crosstalk phenomenon between adjacent signal pins can be prevented, thereby further ensuring integrity of a signal transmitted through each signal pin.

In an embodiment, a quantity of signal pins between any two adjacent ground pins is the same.

For example, a quantity of signal pins between every two adjacent ground pins is set to be the same, that is, the ground pins are evenly disposed at an interval in the plurality of transmission lines. In this way, a quantity of signal pins for which each ground pin correspondingly shields signal crosstalk is also the same, thereby ensuring that quality of a signal transmitted through each signal pin is the same.

In an embodiment, there is one or two signal pins between any two adjacent ground pins.

For example, when there is one signal pin between two adjacent ground pins, shielding can be implemented for each signal pin by using two ground pins on two sides of the signal pin, and signal transmission quality thereof is comparatively high; when there are two signal pins between two adjacent ground pins, the two signal pins may cooperate to form differential signal transmission, and an anti-interference capability thereof is stronger.

In an embodiment, a plurality of first conduction points are formed between the first support foot and the ground pin, and the plurality of first conduction points are arranged at an interval along an extension direction of the ground pin; and/or a plurality of second conduction points are formed between the second support foot and the ground pin, and the plurality of second conduction points are arranged at an interval along the extension direction of the ground pin.

For example, the plurality of first conduction points are disposed, so as to improve reliability of electrical conduction between the first support foot and the ground pin, and form a shunt function for the ground pin. Correspondingly, disposition of the plurality of second conduction points also improves reliability between the second support foot and the ground pin, and also forms a shunt function for the ground pin.

In an embodiment, there are a plurality of shielding sheets, and the plurality of shielding sheets are arranged at an interval along the extension direction of the transmission line.

For example, the plurality of shielding sheets are arranged at the interval along the extension direction of the transmission line, so that a shielding protection effect of a larger area can be formed in the extension direction of the transmission line, and a length requirement of a single shielding sheet is reduced, thereby helping reduce an inductance effect that may be caused by a single shielding sheet to the transmission line.

In an embodiment, main body parts of the plurality of shielding sheets are electrically connected to each other.

For example, the main body parts of the plurality of shielding sheets are electrically connected to each other, so that the plurality of shielding sheets are connected to each other to form a plurality of electrical paths, thereby further preventing generation of a signal current reference return phenomenon, and avoiding crosstalk resonance of a low-band signal.

In an embodiment, the shielding sheet further includes a third support foot, the third support foot is located between the first support foot and the second support foot and is also connected to the main body part, and the third support foot is also electrically connected to the ground pin.

For example, the third support foot is located between the first support foot and the second support foot, so that a length of an electrical path between the first conduction point and the second conduction point is reduced, thereby further reducing an inductance effect that may be caused by the shielding sheet.

In an embodiment, the connector includes an insulating base, and the plurality of transmission lines and the main body part of the shielding sheet are separately connected to the insulating base fixedly, so that the main body part and the plurality of transmission lines are fastened at an interval.

For example, the plurality of transmission lines and the shielding sheet are borne by the insulating base, so as to ensure a position relationship between the transmission lines and the shielding sheet without affecting implementation of an electrical function of the connector.

In an embodiment, the insulating base includes an insulating substrate, the plurality of transmission lines are printed on the insulating substrate, and the shielding sheet is located on a side, of the plurality of transmission lines, facing away from the insulating substrate.

For example, a manner of printing the transmission lines on the insulating substrate facilitates manufacturing, and disposing the shielding sheet on an outer side of the insulating substrate facilitates manufacturing and assembly of the shielding sheet.

In an embodiment, the insulating base includes an insulating substrate, the plurality of transmission lines are printed on the insulating substrate, and the shielding sheet is located inside the insulating substrate.

For example, the shielding sheet is embedded in the insulating substrate, so that relative positions of the shielding sheet and the transmission lines can be ensured.

According to a second aspect, this application relates to an electronic device, including two functional components and the foregoing connector connected between the two functional components.

It can be understood that, because the electronic device in this application is provided with the foregoing connector, a signal transmission speed between the two functional components in the electronic device in this application is higher, and signal integrity and reliability are also ensured.

DESCRIPTION OF EMBODIMENTS

The following describes technical solutions in embodiments of this application with reference to accompanying drawings in the embodiments of this application. Apparently, the described embodiments are some but not all of embodiments of this application. All other embodiments obtained by a person of ordinary skill in the art based on the embodiments of this application without creative efforts shall fall within the protection scope of this application.

In this specification, the sequence numbers, such as "first" and "second", of components are intended to distinguish between the described objects, and do not have any sequential or technical meaning. Unless otherwise specified, the "connection" in this application includes a direct connection and an indirect connection. In the descriptions of this application, it should be understood that an orientation or a position relationship indicated by the terms "above", "below", "front", "back", "top", "bottom", "inside", "outside", and the like is based on an orientation or a position relationship shown in the accompanying drawings, and is intended for ease of describing this application and simplifying description, but does not indicate or imply that a described apparatus or element needs to have a specific orientation or be constructed and operated in a specific orientation. Therefore, such terms shall not be understood as a limitation on this application.

In this application, unless otherwise specified and limited, when a first feature is "above" or "below" a second feature, the first feature may be in direct contact with the second feature, or the first feature may be in indirect contact with the second feature through an intermediate medium. In addition, that the first feature is "above" or "over" the second feature may be that the first feature is right above or obliquely above the second feature, or mean that a horizontal height of the first feature is greater than that of the second feature. That the first feature is "below" or "under" the second feature may be that the first feature is right below or obliquely below the second feature, or mean that a horizontal height of the first feature is less than that of the second feature.

Figure 1:
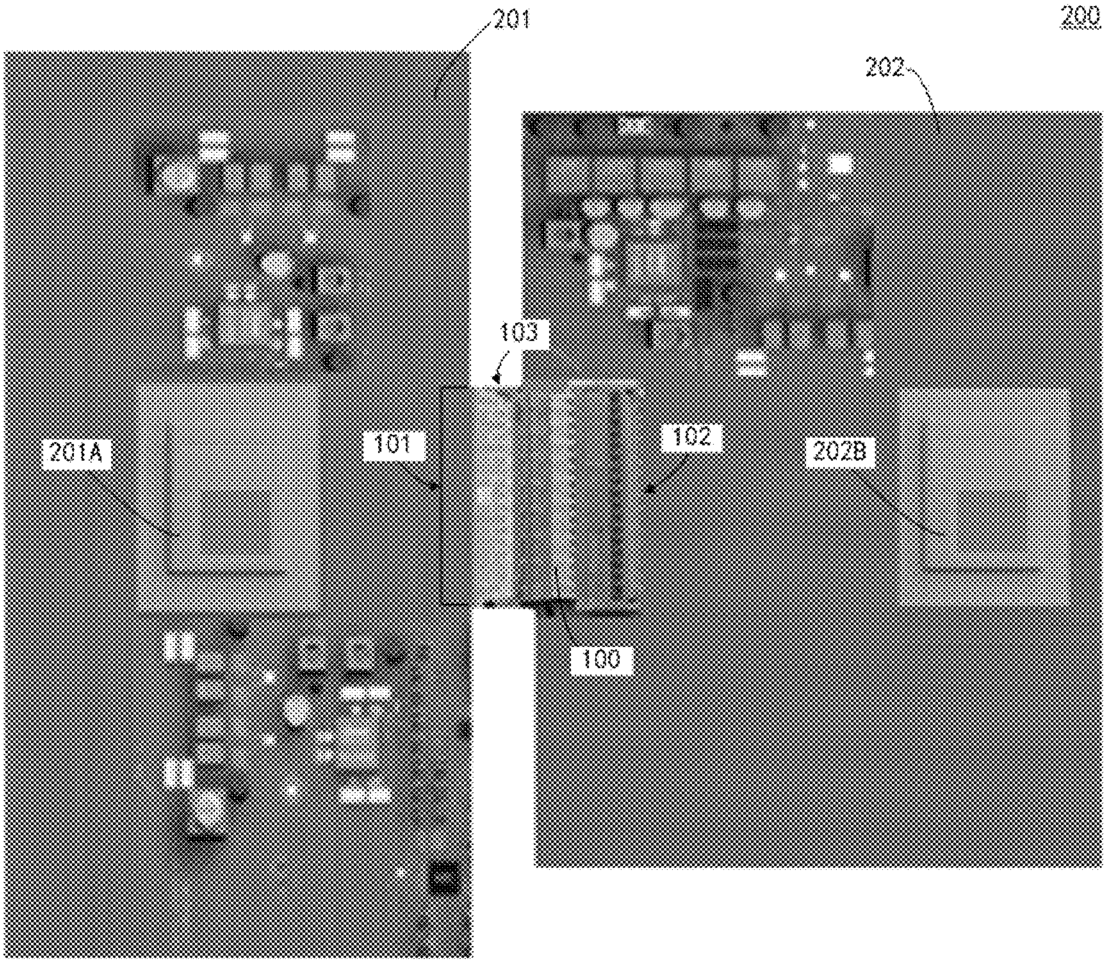
FIG. 1 is a schematic diagram of an internal structure of an electronic device according to this application.

Refer to an example in FIG. 1 showing an inner structure of an electronic device 200 according to an embodiment of this application. The electronic device 200 in this application includes a first functional component 201 and a second functional component 202. A first chip 201A is disposed on the first functional component 201, and a second chip 202B is disposed on the second functional component 202. In the example in FIG. 1, both the first functional component 201 and the second functional component 202 are circuit boards, and the first chip 201A and the second chip 202B are respectively connected to the circuit boards. In addition, a connector 100 in this application is further disposed between the first functional component 201 and the second functional component 202. The connector 100 in this application is connected between the first functional component 201 and the second functional component 202, and is configured to implement signal transmission between the first chip 201A and the second chip 202B.

In some other embodiments, the electronic device 200 provided in this application may further include more functional components, where the connector 100 in this application may also be disposed between the plurality of functional components, to implement signal transmission between any two functional components by using the connector 100. In addition, in some embodiments, more chips may be further disposed on the first functional component 201, and the more chips also implement signal transmission with the second chip 202B on the second functional component 202 by using the connector 100; or a plurality of chips are disposed on the second functional component 202, and the plurality of chips also implement a function of signal transmission with the first chip 201A on the first functional component 201 by using the connector 100.

When mounted in the electronic device 200 in this application, the connector 100 in this application is configured to implement various functions of the electronic device 200. The electronic device 200 in this application may be any device with a communication, computing, or storage function, for example, an intelligent device such as a tablet computer, a mobile phone, an e-reader, a remote control, a personal computer (PC), a notebook computer, a vehicle-mounted device, a network television, a smart appliance, or a wearable device.

In the example in FIG. 1, the connector 100 includes a first connection end 101, a second connection end 102, and a data transmission segment 103 connected between the first connection end 101 and the second connection end 102. The first connection end 101 and the first functional component 201 are fixedly connected, and are electrically connected to transmit a signal. The second connection end 102 and the second functional component 202 are fixedly connected, and are electrically connected to transmit a signal. The first connection end 101 and the first functional component 201 may be fixedly and electrically connected to each other in a manner such as welding, spring pressing, pin plug-in, or backplane connector crimping. The second connection end 102 and the second functional component 202 may also be fixedly and electrically connected to each other in the foregoing manner. In the example shown in FIG. 1, the data transmission segment 103 is connected between the first connection end 101 and the second connection end 102 by using a flexible flat cable structure. A flexible flat cable has a characteristic of being bendable, and may be adaptively bent in coordination with relative positions of the first functional component 201 and the second functional component 202, thereby facilitating arrangement of the first functional component 201 and the second functional component 202 in the electronic device 200 in this application.

Figure 2:
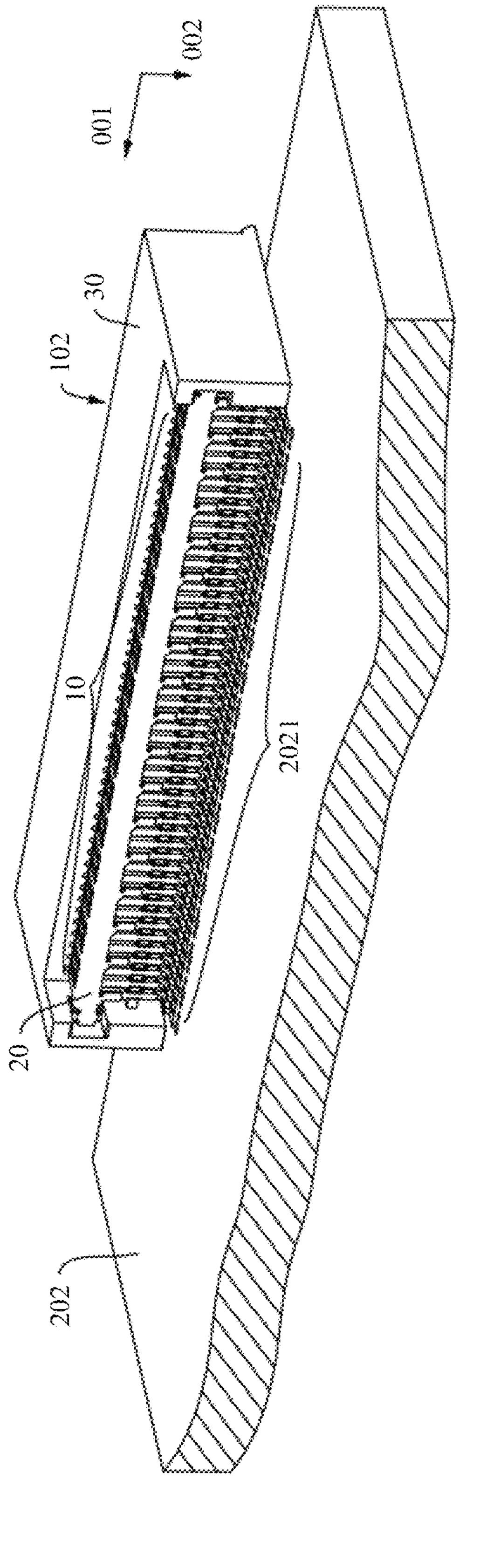
FIG. 2 is a schematic diagram of a structure of a connection part between a second functional component in an electronic device and a connector according to this application.

Refer to an example in FIG. 2 showing a connection between the second connection end 102 of the connector 100 in this application and the second functional component 202. The connector 100 includes a housing 30, a plurality of transmission lines 10, and a shielding sheet 20 at the second connection end 102. The housing 30 is of an insulating material, and is also understood as an insulating base material in the connector 100. In the example in FIG. 2, the housing 30 is of a cuboid structure, and the housing 30 is fixedly connected to the second functional component 202, so as to implement a fixed connection between the second connection end 102 and the second functional component 202. In some other embodiments, the insulating base material may be alternatively implemented by using a plate structure such as an insulating substrate 33 (refer to FIG. 13).

The plurality of transmission lines 10 are fixedly connected to the housing 30, that is, the housing 30 is configured to hold the plurality of transmission lines 10. The plurality of transmission lines 10 are arranged parallel to each other, and there is an interval between any two transmission lines 10. The plurality of transmission lines 10 extend in a same direction (which is a second direction 002 shown in the figure). Refer to a partial structure shown as an example in FIG. 3. In this embodiment of this application, an extension path of a single transmission line 10 actually bends twice. In other words, a bending section 13 is formed on an extension path of each transmission line 10. In a parallel extension process of the plurality of transmission lines 10, distances, bending radii, bending angles, and the like of bending sections 13 of the plurality of transmission lines 10 are the same, and after bending, the transmission lines 10 are still parallel to each other and extend side by side in the same direction. Therefore, whether the transmission line 10 bends, that is, whether the transmission line 10 has the bending section 13, does not affect a limitation defined in this application that the plurality of transmission lines 10 extend in the same direction. In other words, in any position on the extension path of the transmission line 10, the plurality of transmission lines 10 are in a posture of extending in the same direction.

Figure 3:
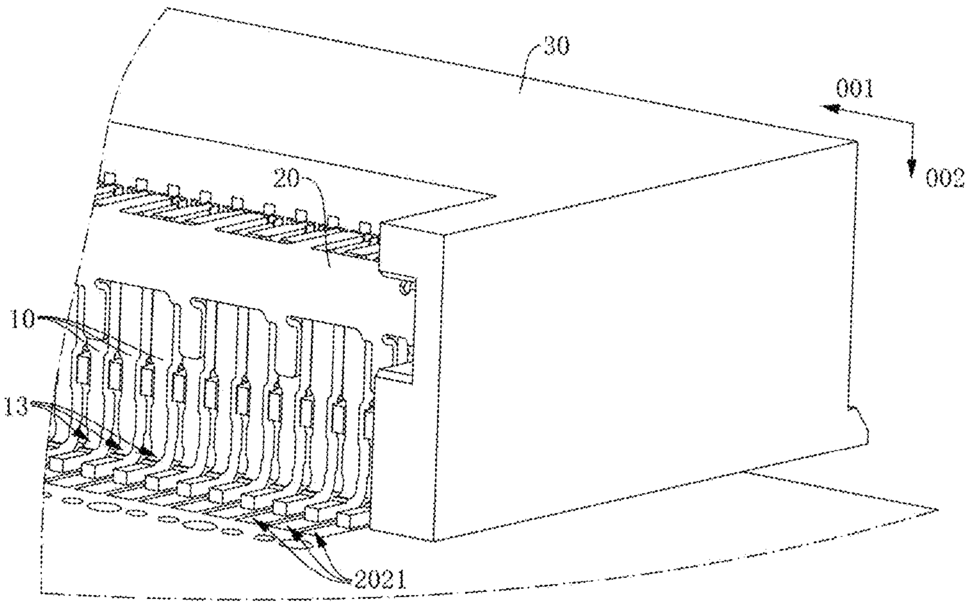
FIG. 3 is a schematic diagram of a partial structure of the connection part between the second functional component and the connector according to FIG. 2.

Still referring to FIG. 3, the transmission lines 10 are used as a structure for implementing signal transmission in the connector 100 in this application. When connected to the second functional component 202, the transmission lines 10 are respectively electrically connected to contact points 2021 of the second functional component 202. In the example in FIG. 3, each contact point 2021 is constructed as a land structure, and the transmission lines 10 are respectively connected to the contact points 2021 through welding. It can be understood that, in another embodiment, the contact point 2021 and the transmission line 10 may be electrically connected to each other in another manner. The other end of the transmission line 10 is electrically connected to the data transmission segment 103 of the connector 100. The second connection end 102 transfers an electrical signal in the data transmission segment 103 to the second functional component 202 through the plurality of transmission lines 10.

Figure 4:
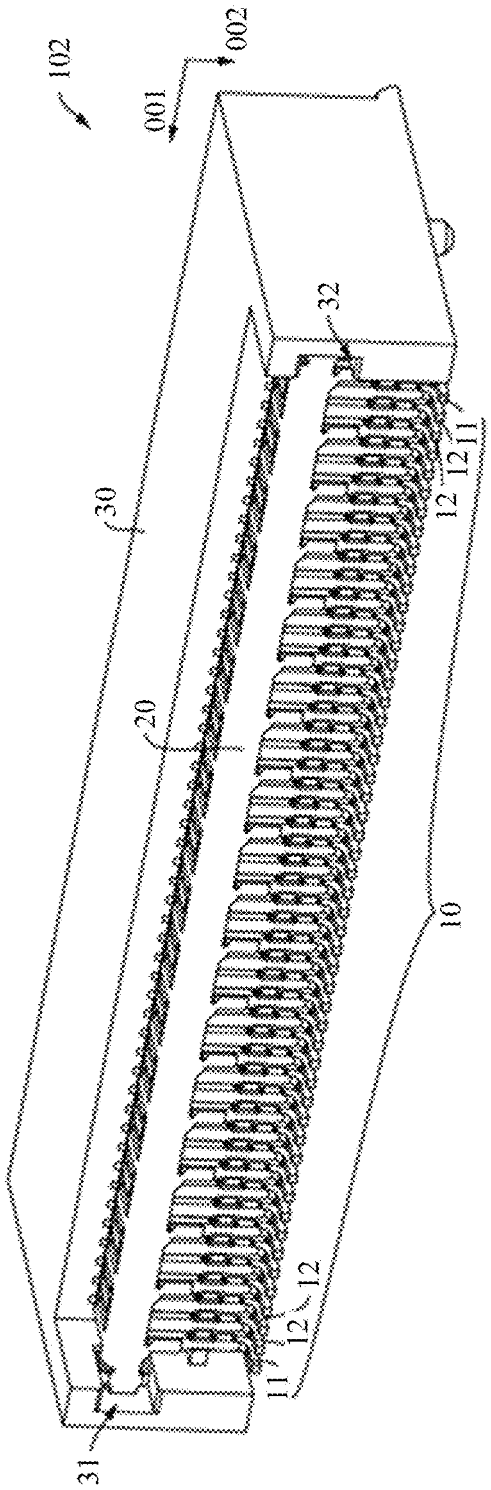
FIG. 4 is a schematic diagram of a structure of the connector according to FIG. 2.
Figure 5:
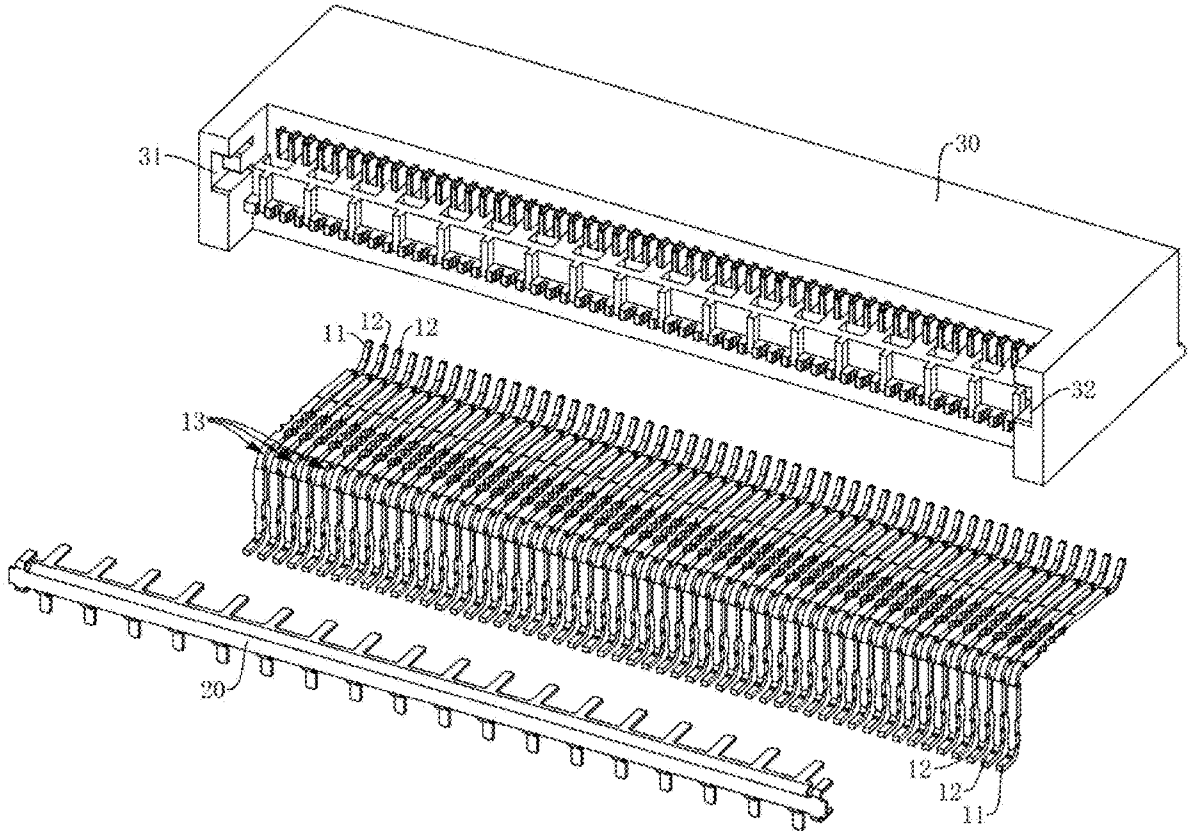
FIG. 5 is a schematic exploded view of the connector according to FIG. 2.

Refer to an example in FIG. 4 showing a structure of the second connection end 102 in the connector 100 in this application, and an example in FIG. 5 showing an exploded view of the structure of the second connection end 102. The plurality of transmission lines 10 in this application further include at least one ground pin 11 and a plurality of signal pins 12. The signal pin 12 is configured to transmit a data signal, and the ground pin 11 provides a basic potential required for transmitting a data signal in the signal pin 12. After separately receiving data transmitted through the ground pin 11 and data transmitted through the signal pin 12, the second functional component 202 may compare an electrical signal in the signal pin 12 with a basic potential in the ground pin 11, to obtain electrical signal data transmitted by the first functional component 201. Alternatively, when transmitting data to the first functional component 201, the second functional component 202 simultaneously applies a basic potential to the ground pin 11 and a data signal to the signal pin 12. After simultaneously receiving data in the ground pin 11 and data in the signal pin 12, the first functional component 201 may obtain, in a similar manner, electrical signal data transmitted by the second functional component 202. Disposing the ground pin 11 can shield a crosstalk problem caused by a peripheral signal, so that a signal transmitted in the connector 100 has higher quality and higher integrity.

Figure 6:
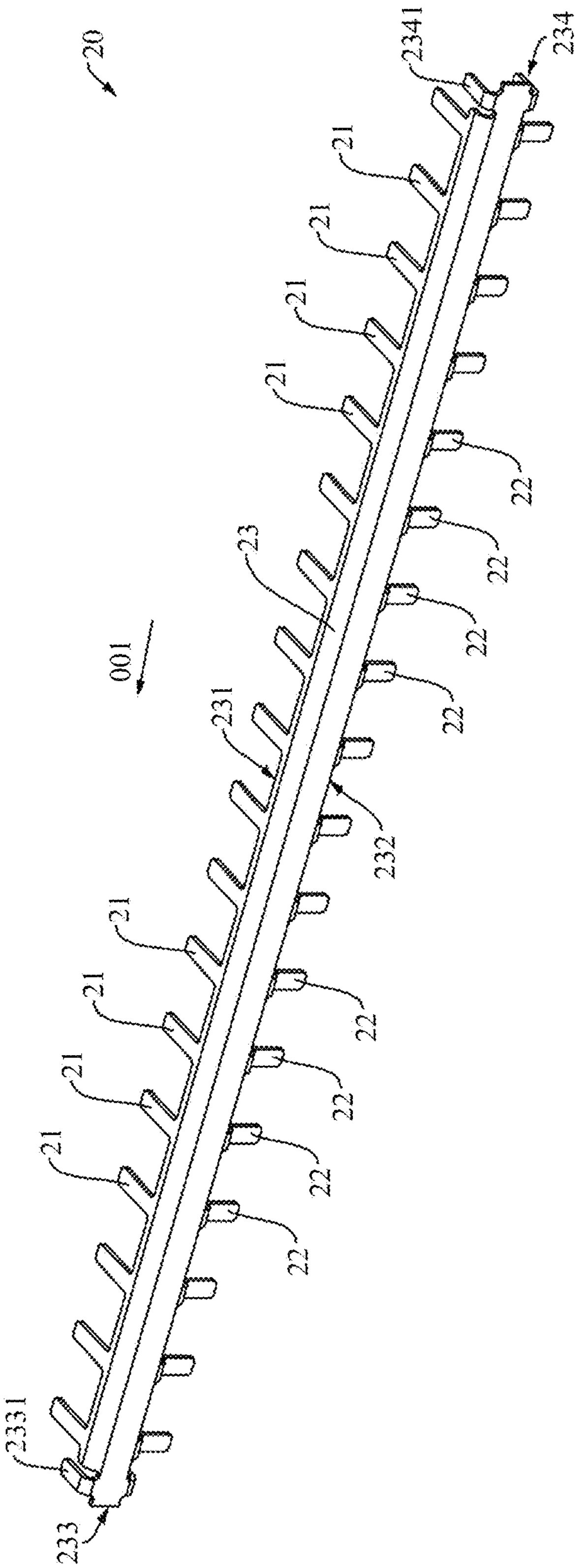
FIG. 6 is a schematic diagram of a structure of a shielding sheet in the connector according to FIG. 2.

The shielding sheet 20 in this application is mainly configured to shield signal crosstalk that may be formed by a signal in a peripheral environment for the transmission line 10. For example, with reference to FIG. 6, the shielding sheet 20 includes a main body part 23, a first support foot 21, and a second support foot 22. The main body part 23 is approximately in a shape of a long strip, and has a first side edge 231 and a second side edge 232 that are opposite. The first support foot 21 and the second support foot 22 are respectively disposed on two sides of the main body part 23. The first support foot 21 is located on a side closer to the first side edge 231, and the first support foot 21 extends from the first side edge 231 in a direction leaving the main body part 23. In this case, the first support foot 21 is connected to the main body part 23. The second support foot 22 is located on a side closer to the second side edge 232, and the second support foot 22 extends from the second side edge 232 in a direction leaving the main body part 23. In this case, the second support foot 22 is also connected to the main body part 23.

The main body part 23 is spaced apart from the transmission lines 10, and is also fastened to the housing 30. The main body part 23 further spans the plurality of transmission lines 10 along a first direction 001. For example, the main body part 23 further includes a first end 233 and a second end 234. The first end 233 and the second end 234 are respectively located at two opposite ends of the main body part 23 along a length direction (that is, the first direction 001) of the main body part 23. In a direction in which the plurality of transmission lines 10 are disposed side by side, the first end 233 is located on one side of the plurality of transmission lines 10, and the second end 234 is located on the other side of the plurality of transmission lines 10. In this way, the main body part 10 can be disposed astride the transmission lines 10.

Referring to FIG. 4 and FIG. 5, the housing 30 is provided with a first clamping slot 31 and a second clamping slot 32, and the first end 233 and the second end 234 are respectively provided with a first clamping foot 2331 and a second clamping foot 2341. The first clamping slot 31 is disposed in correspondence with the first clamping foot 2331, and is configured to accommodate and fasten the first clamping foot 2331. The second clamping slot 32 is disposed in correspondence with the second clamping foot 2341, and is configured to accommodate and fasten the second clamping foot 2341. In this way, the shielding sheet 20 is fastened to the housing 30 and spans the transmission lines 10. It should be noted that structures of the first clamping foot 2331 and the second clamping foot 2341 are provided as an example. A specific connection manner between the main body part 23 and the housing 30 is not limited in the connector 100 in this application. In some other embodiments, alternatively, the main body part 23 may be fixedly connected to the housing 30 in any manner such as bolt fastening or integral injection molding.

Referring to the example in FIG. 5, in an embodiment shown in the figure, the main body part 23 is fastened in correspondence with the bending sections 13 of the plurality of transmission lines 10. Therefore, a shape of the main body part 23 also bends with an angle change of the transmission lines 10. Therefore, the first side edge 231 and the second side edge 232 are respectively formed on side walls, of the main body part 23, in different directions. In this case, that the first side edge 231 and the second side edge 232 are disposed opposite each other may be understood as that the two side edges bend and deform with the main body part 23, or may be understood as that the first side edge 231 and the second side edge 232 are disposed opposite each other along a bending path of the transmission line 10. It can be understood that, in some other embodiments, when the transmission line 10 is of a planar structure (referring to FIG. 13), the main body part 23 does not need to bend or deform. In this case, the first side edge 231 and the second side edge 232 are disposed opposite each other in a same direction.

Figure 7:
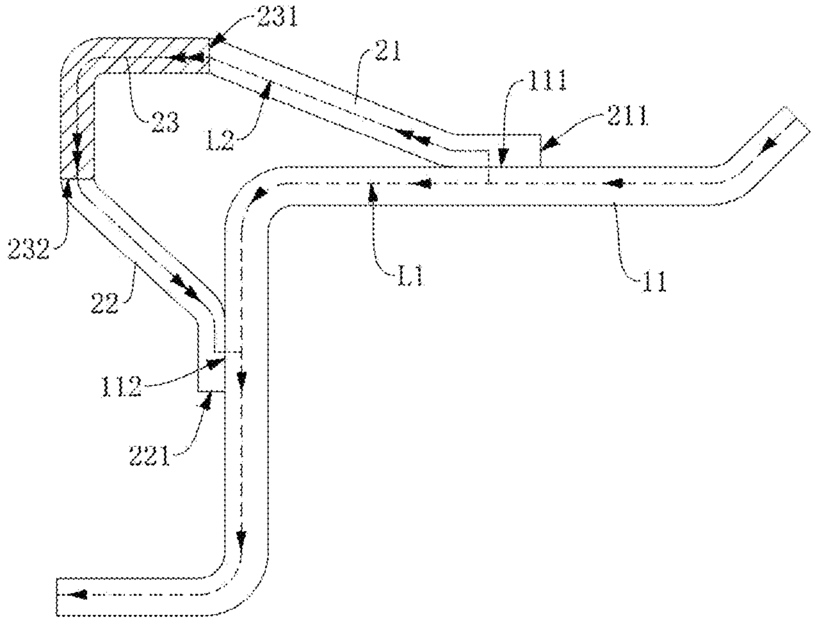
FIG. 7 is a schematic diagram of an electrical path formed between a shielding sheet and a ground pin in the connector according to FIG. 2.

From the first side edge 231, the first support foot 21 extends away from the main body part 23. There is a first conduction end 211 in a position that is on the first support foot 21 and that faces away from the main body part 23. The first support foot 21 extends toward one ground pin 11 in the plurality of transmission lines 10, and is electrically connected to the ground pin 11. The first support foot 21 may be electrically connected to the ground pin 11 in a manner such as welding, pressing, or the like. For details, refer to an example in FIG. 7. The first support foot 21 and the ground pin 11 form at least one first conduction point 111. The first conduction point 111 is further located on a side, of the first side edge 231, facing away from the second side edge 232.

From the second side edge 232, the second support foot 22 extends away from the main body part 23. There is also a second conduction end 221 in a position that is on the second support foot 22 and that faces away from the main body part 23. The second support foot 22 also extends toward one ground pin 11, and is electrically connected to the ground pin 11. The second support foot 22 may also be electrically connected to the ground pin 11 in a manner such as welding, pressing, or the like. For example, the second support foot 22 and the ground pin 11 form at least one second conduction point 112. The second conduction point 112 is further located on a side, of the second side edge 232, facing away from the first side edge 231.

In some embodiments, a quantity of first support feet 21 is the same as a quantity of second support feet 22. In addition, each second support foot 12 is disposed in correspondence with a position of one first support foot 11, that is, a first support foot 21 and a second support foot 22 whose positions correspond to each other are symmetrically disposed relative to the main body part 23. In addition, the quantity of first support feet 21 is also the same as a quantity of ground pins 11 in the plurality of transmission lines 10. A first support foot 21 and a second support foot 22 whose positions correspond to each other are electrically connected to a same ground pin 11. It can be understood that, in some other embodiments, quantities of first support feet 21, second support feet 22, and ground pins 11 may alternatively be different. Provided that each of a plurality of ground pins 11 is connected by using the first support foot 21 and the second support foot 22, and an electrical path connected to two opposite sides of the main body part is formed, an effect of the solution of the connector 100 in this application can also be implemented.

The shielding sheet 20 is electrically conductive. The first support foot 21, the second support foot 22, and the main body part 23 are all capable of conducting electricity. Because the first support foot 21 is electrically connected to the ground pin 11 corresponding to the first support foot 21, and the second support foot 22 is also electrically connected to the same ground pin 11, two parallel current flow paths are formed between the first conduction point 111 and the second conduction point 112. A first current flow path L1 is a flow path formed in an extension direction of the ground pin 11. A second current flow path L2 starts from the first conduction point 111, successively passes through the first support foot 21, the main body part 23, and the second support foot 22, reaches the second conduction point 112, and then returns to the ground pin 11.

The shielding sheet 20 is configured to isolate crosstalk that may be caused by an external environment to a signal transmitted in the transmission line 10. It can be understood that, when there are two or more ground pins 11, there are also two or more first support feet 21 and two or more second support feet 22, and each ground pin 11 is electrically connected to one first support foot 21 and one second support foot 22. Because the main body part 23 is also electrically conductive, and each first support foot 21 and each second support foot 22 are further connected to the main body part 23, the main body part 23 that spans all the transmission lines 10 electrically connects each ground pin 11, so that a basic potential in each ground pin 11 also remains at a same level, and crosstalk that may be caused by an external environment to a signal transmitted in the transmission line 10 is effectively isolated.

Figure 8:
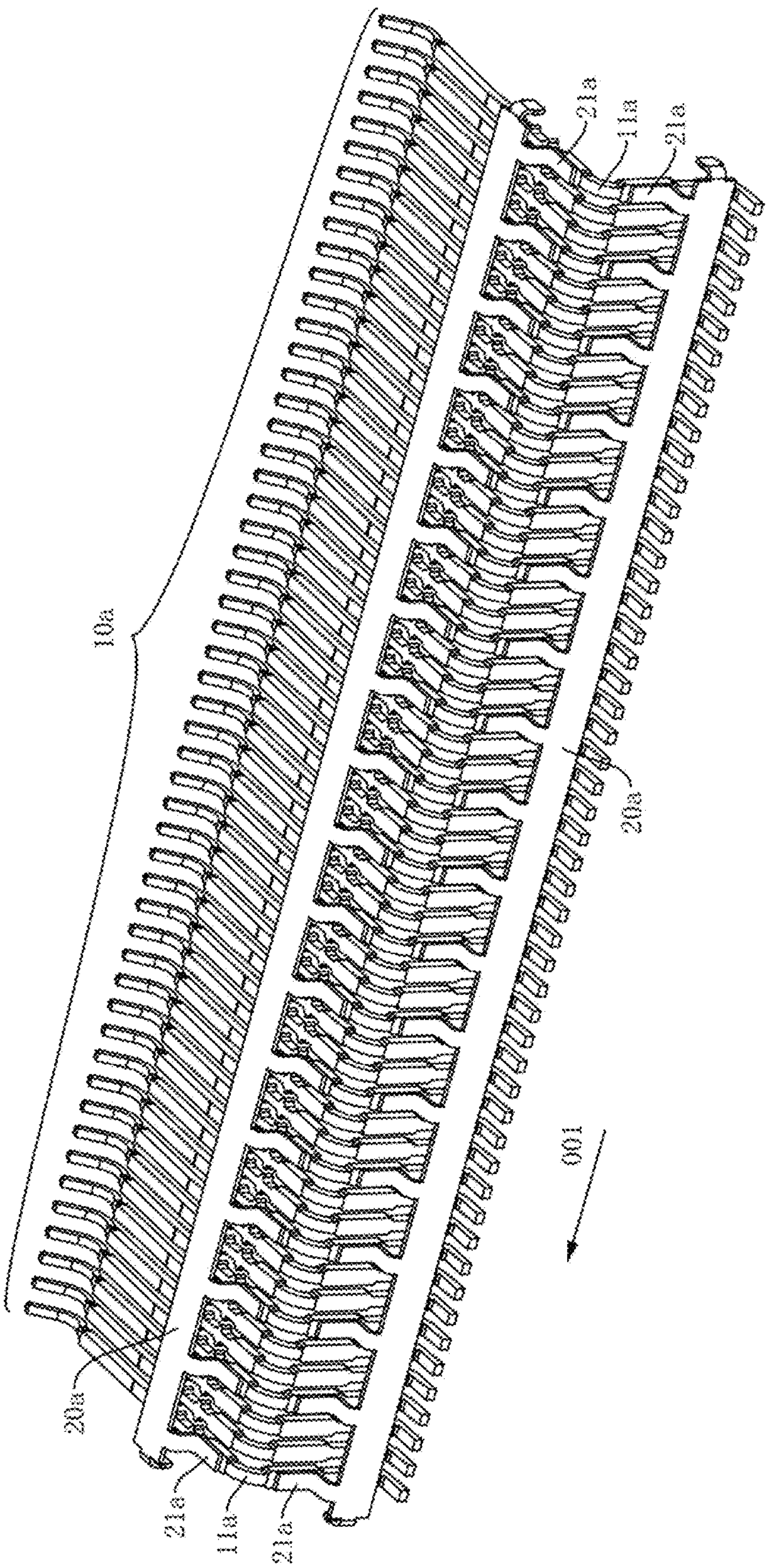
FIG. 8 is a schematic diagram of a structure of a connector in a conventional technology.

FIG. 8 shows an example of a shielding structure in a connector in a conventional technology. In the connector in the conventional technology, a plurality of existing transmission lines 10*a* extending parallel and an existing shielding sheet 20*a* configured to implement a shielding function are also disposed. In FIG. 8, there are two existing shielding sheets 20*a*. In the existing transmission lines 10*a*, there are also a plurality of existing ground pins 11*a*. The existing shielding sheet 20*a* extends a plurality of existing support feet 21*a* from only one side of an existing main body part 23*a*, and each existing support foot 21*a* is electrically connected to one existing ground pin 11*a*. The shielding sheet 20*a* in the conventional technology forms an open-circuit structure. When an electrical signal in the existing ground pin 11*a* is conducted to the existing support foot 21*a*, because there is no structure of the existing support foot 21*a* on the other side of the existing shielding sheet 20*a*, after a current is conducted to the existing main body part 23*a* through the existing support foot 21*a*, the current needs to return to the existing ground pin 11*a* through the same existing support foot 21*a*, to continue to be transmitted along an extension path of the existing ground pin 11*a*. Therefore, while implementing potential balance between the plurality of existing ground pins 11*a*, the existing shielding sheet 20*a* does not prevent electrical signal current reference return well, and consequently, a low-band signal of the connector in the conventional technology forms crosstalk resonance.

Figure 9:
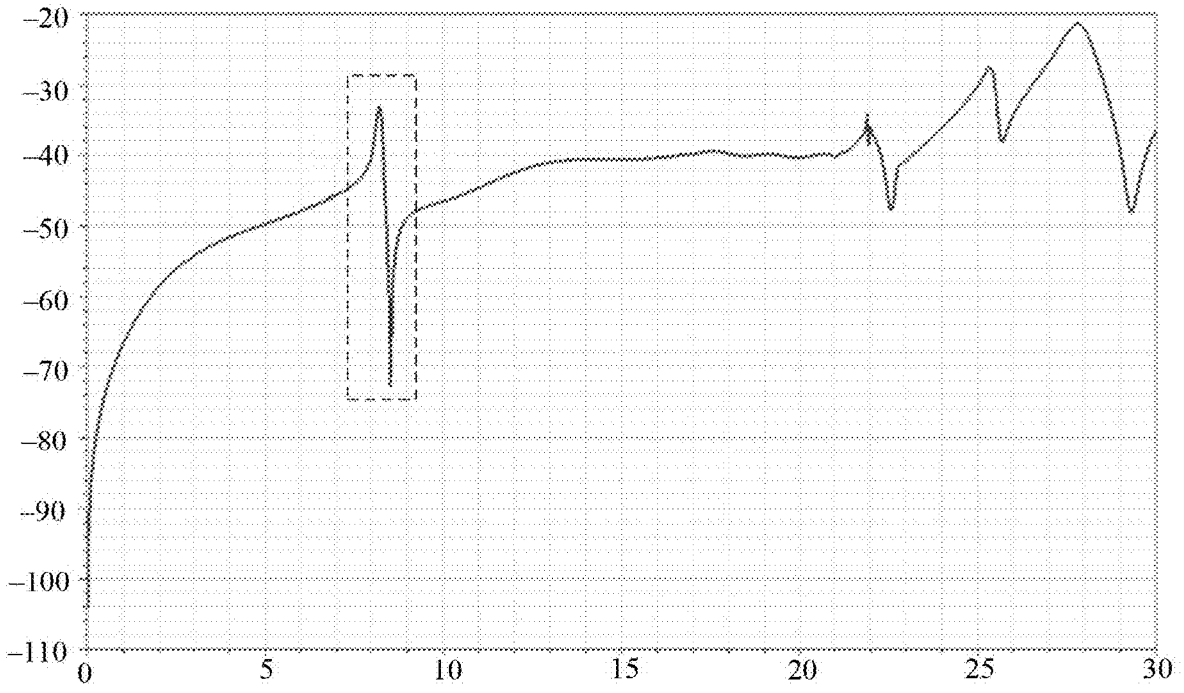
FIG. 9 is a schematic diagram of a crosstalk resonance simulation result of the connector in the conventional technology according to FIG. 8.

FIG. 9 shows an example of a crosstalk resonance simulation diagram of the connector in the conventional technology. In FIG. 9, a vertical coordinate is an amplitude of crosstalk resonance, and a horizontal coordinate is a frequency of an electrical signal. It can be learned from a simulation result in FIG. 9 that, in the conventional technology, a frequency band with a comparatively large crosstalk resonance amplitude (a dashed-line boxed area) is a frequency band of approximately 8.5 Hz. This frequency band is within a range of current high-speed signal transmission (28 Gb/s). When the connector in the conventional technology transmits a signal, comparatively large crosstalk resonance may be formed because a signal transmission speed of the connector is close to the frequency band. Consequently, integrity of a signal transmitted in the connector in the conventional technology is damaged, and high-speed signal transmission quality is poor.

Figure 10:
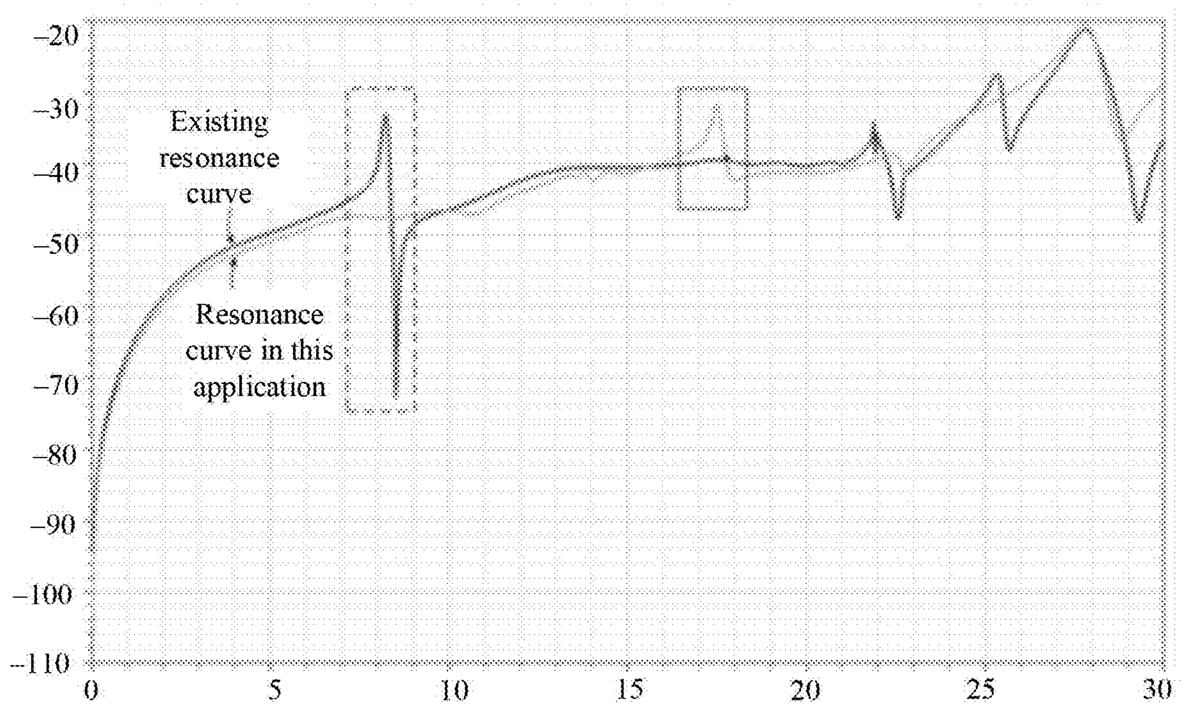
FIG. 10 is a schematic diagram of comparison between crosstalk resonance simulation results of a connector in this application and a connector in a conventional technology.

By contrast, in the connector 100 in this application, the first support foot 21 and the second support foot 22 respectively located on the two sides of the main body part 23 are disposed, so that the shielding sheet 20 can form, for the ground pin 11, an electrical path passing through the main body part 23, and a current transmitted to the main body part 23 through the first support foot 21 can return to the ground pin 11 through the second support foot 22, and continue to be transmitted along the extension direction of the ground pin 11. Refer to an example in FIG. 10 showing a crosstalk resonance simulation diagram of the connector 100 in this application. After the connector 100 in this application is configured based on the foregoing solution, a frequency band with a comparatively large crosstalk resonance amplitude (a solid-line boxed area) of the connector 100 in this application is a frequency band of approximately 16 Hz. This frequency band is out of the range of current high-speed signal transmission (28 Gb/s). Therefore, in a working process of the connector 100 in this application, the connector 100 is not affected by excessively large crosstalk resonance. That is, the connector 100 in this application can effectively prevent a signal current reference return phenomenon, thereby improving signal transmission integrity of the connector 100.

It can be understood that, because the electronic device 200 in this application is provided with the connector 100 in this application, comparatively large low-frequency crosstalk resonance impact is not formed in a process of high-speed signal transmission between the first functional component 201 and the second functional component 202 in the electronic device 200 in this application. In addition to ensuring a higher signal transmission speed of the electronic device 200 in this application, integrity and reliability of signal transmission in the electronic device 200 in this application are also ensured.

In an embodiment, the first support foot 21 and the second support foot 22 are disposed parallel to an extension direction of the transmission line 10. To be specific, the first support foot 21 is disposed to be parallel to the extension direction of the transmission line 10, and the first support foot 21 is also parallel to the ground pin 11 electrically connected to the first support foot 21. In this way, an extension distance from the first conduction end 211 of the first support foot 21 to the main body part 23 is shortened, that is, a length of the first support foot 21 is reduced. When the first support foot 21 is excessively long, the shielding sheet 20 forms a comparatively large inductance effect for the ground pin 11. Therefore, reducing the length of the first support foot 21 can correspondingly reduce an inductance effect between the shielding sheet 20 and the transmission line 10.

Correspondingly, the second support foot 22 is also disposed parallel to the extension direction of the transmission line 10, so that an extension distance from the second conduction end 221 of the second support foot 22 to the main body part 23 is also correspondingly shortened, and a length of the second support foot 22 is also reduced. This can also reduce an inductance effect formed by the shielding sheet 20 for the transmission line 10.

In an embodiment, a length direction of the main body part 23 is set to be perpendicular to the extension direction of the transmission line 10. Because the plurality of transmission lines are parallel to each other and arranged at an interval, when the main body part 23 spans the plurality of transmission lines, the length direction of the main body part 23 being perpendicular to the extension direction of the transmission line 10 can minimize a length size of the main body part 23. In this way, an overall volume and a resistance value of the main body part 23 are reduced. This also helps control an inductance effect formed by the shielding sheet 20 for the plurality of transmission lines 10 in this application.

Figure 11:
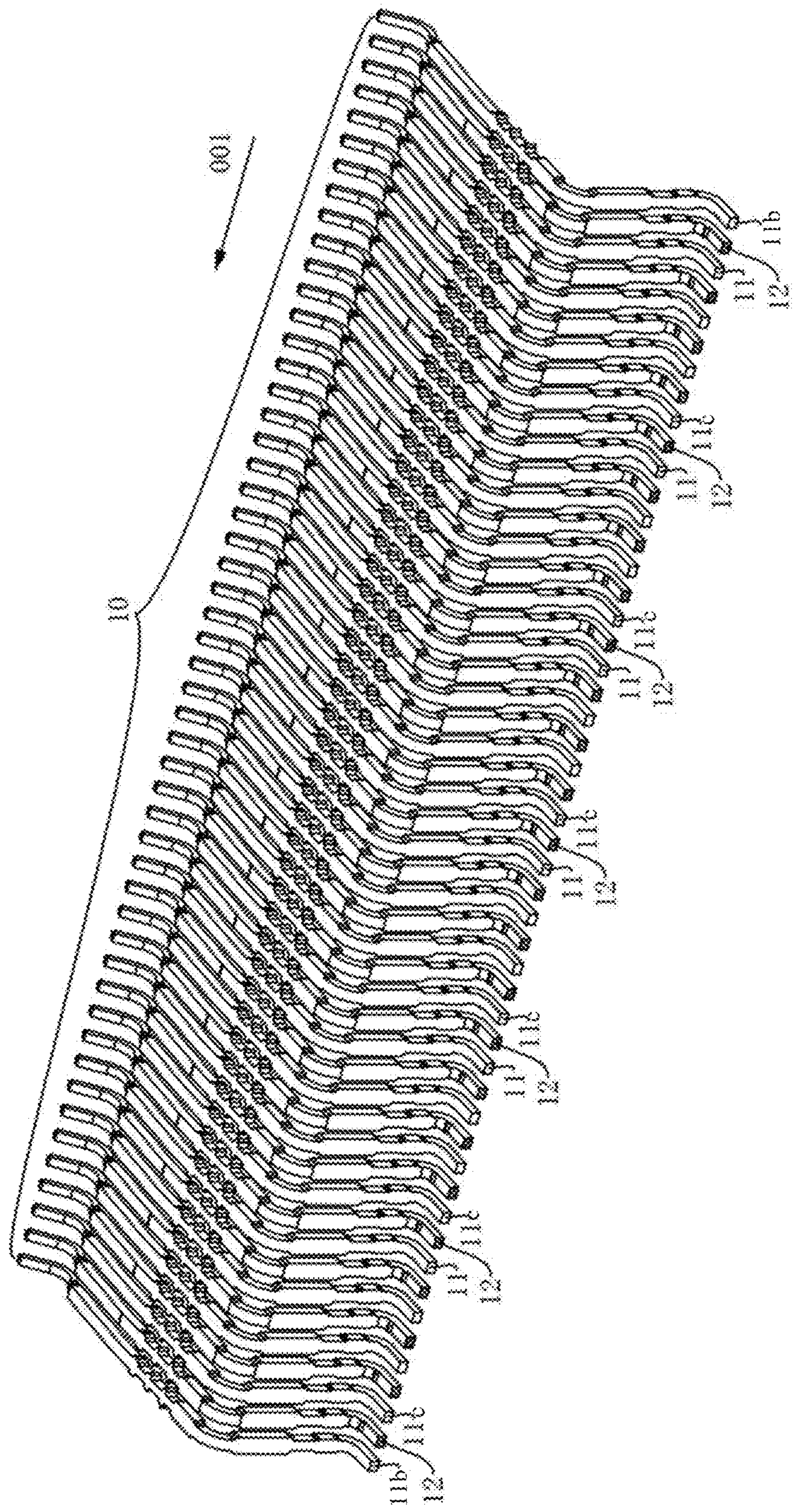
FIG. 11 is a schematic diagram of arrangement of a plurality of transmission lines in the connector according to FIG. 2.

Refer to an example in FIG. 11 showing arrangement of the plurality of transmission lines 10. As mentioned above, the transmission lines 10 further include the ground pin 11 and the signal pins 12. The ground pin 11 is configured to provide a basic potential, so as to cooperate with the signal pin 12 in transmission, and ensure quality of an electrical signal transmitted through the signal pin 12. The ground pin 11 shown in FIG. 11 further includes two side ground pins **11*b*. The signal pins 12 in the transmission lines 10 are all arranged between the two side ground pins 11*b*. One side ground pin 11*b* is located at an edge of one side of a parallel arrangement direction of the plurality of signal pins 12, and the other side ground pin 11*b* is located at an edge of the other side of the parallel arrangement direction of the plurality of signal pins 12. The two side ground pins 11*b* located at the outermost edges of the two sides of the plurality of signal pins 12 can effectively shield signal crosstalk on the respective sides, thereby ensuring electrical signal transmission of the signal pins 12 located between the two side ground pins 11*b***.

In an embodiment, the ground pin 11 further includes a plurality of intermediate ground pins **11*c*. The intermediate ground pins 11*c* are disposed at an interval among the plurality of signal pins 12, and at least one signal pin 12 is disposed between any two adjacent ground pins 11. The intermediate ground pins 11*c* can provide a more reliable shielding effect for the signal pins 12, and prevent a signal crosstalk phenomenon between adjacent signal pins 12**.

In addition, the ground pin 11 includes the side ground pins **11*b* and the intermediate ground pins 11*c*, and therefore, that at least one signal pin 12 is disposed between any two adjacent ground pins 11 means that at least one signal pin 12 is disposed between any two adjacent intermediate ground pins 11*c* and between the side ground pin 11*b* and an intermediate ground pin 11*c* adjacent to the side ground pin 11*b*. Any two adjacent ground pins 11 can form a shielding effect for at least one signal pin 12 from two opposite sides, thereby ensuring signal transmission quality of each signal pin 12 in the transmission lines 10**.

In an embodiment, a quantity of signal pins 12 between any two adjacent ground pins 11 is the same. In other words, the ground pins 11 are evenly arranged at an interval in the plurality of transmission lines 10. In this way, a quantity of signal pins 12 for which each ground pin 11 correspondingly shields signal crosstalk is also the same, thereby ensuring that quality of a signal transmitted through each signal pin 12 is the same.

Figure 12:
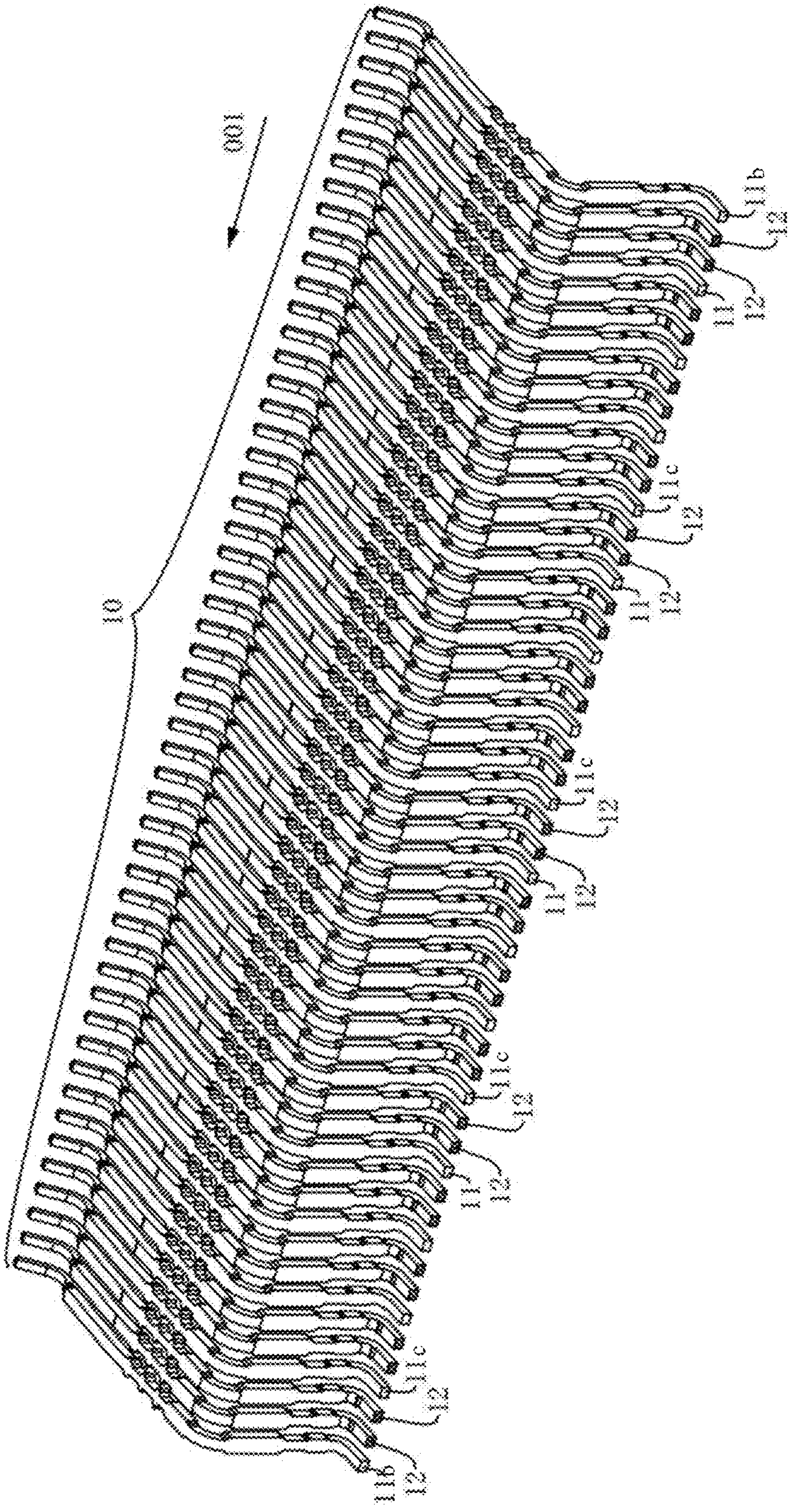
FIG. 12 is a schematic diagram of arrangement of a plurality of transmission lines in the connector according to FIG. 2 in another embodiment.

In the arrangement manner of the transmission lines 10 shown in FIG. 11, there is one signal pin 12 between two adjacent ground pins 11. In this case, a pair of ground pins 11 are disposed on both sides of each signal pin 12 to perform shielding protection for the signal pin 12, so that signal transmission quality of each signal pin 12 can be ensured. In the arrangement manner of the transmission lines 10 shown in FIG. 12, there are two signal pins 12 between two adjacent ground pins 11. The two signal pins 12 may cooperate to implement a differential signal transmission manner. Because a distance between the two signal pins 12 is comparatively short, signal offsets of the two signal pins 12 under impact of signal crosstalk tend to be the same. Therefore, using the differential signal transmission manner can further improve an anti-interference capability of the connector 100 in this application.

Figure 13:
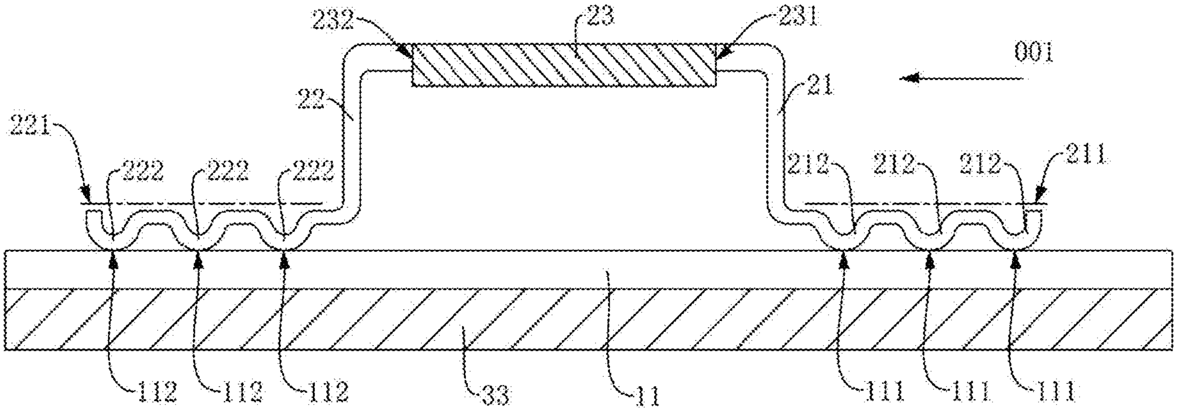
FIG. 13 is a partial cross-sectional schematic view of a connector according to another embodiment of this application.

As mentioned above, the transmission lines 10 may be alternatively laid on a plane, for example, on the insulating substrate 33 of a printed circuit board, to transmit a signal. FIG. 13 is an example of a sectional view of the transmission line 10 laid on the insulating substrate 33 in the connector 100 in this application. In this case, the transmission line 10 is the ground pin 11, and the main body part 23 is spaced apart from the ground pin 11 and is fastened on a side, of the ground pin 11, facing away from the insulating substrate 33. A plurality of first bonding parts 212 are disposed on the first conduction end 211 of the first support foot 21. The plurality of first bonding parts 212 are arranged at an interval along the extension direction of the ground pin 11, and the plurality of first bonding parts 212 are connected in series to each other. The first bonding parts 212 bend toward the ground pin 11 from one side of the main body part 23, and are in contact with and connected to the ground pin 11. In other words, one first conduction point 111 is formed between each first bonding part 212 and the ground pin 11. A plurality of first conduction points 111 are arranged at an interval along the extension direction of the ground pin 11. The first bonding part 212 and the ground pin 11 may be connected to each other through welding or through elastic pressing. Disposing the plurality of first conduction points 111 can improve reliability of electrical conduction between the first support foot 21 and the ground pin 11, and form a shunt function for an electrical signal in the ground pin 11. When one or more first bonding parts 212 are in poor contact with the ground pin 11, an electrical signal in the ground pin 11 can still be electrically conducted to the first support foot 21 through the rest of the first bonding parts 212.

Correspondingly, a plurality of second bonding parts 222 are also disposed on the second conduction end 221 of the second support foot 22, the plurality of second bonding parts 222 are also arranged at an interval along the extension direction of the ground pin 11, and the plurality of second bonding parts 222 are also connected in series to each other. The second bonding parts 222 also bend toward the ground pin 11 from one side of the main body part 23, and are in contact with and connected to the ground pin 11. In other words, one second conduction point 112 is formed between each second bonding part 222 and the ground pin 11. A plurality of second conduction points 112 are arranged at an interval along the extension direction of the ground pin 11. The second bonding part 222 and the ground pin 11 may also be connected to each other through welding or through elastic pressing. Disposing the plurality of second conduction points 112 can also improve reliability of electrical conduction between the second support foot 22 and the ground pin 11, and form a shunt function for an electrical signal in the ground pin 11.

It should be noted that an embodiment of the plurality of first conduction points 111 and the plurality of second conduction points 112 may also be applied to various embodiments of the connector 100 shown in FIG. 2 to FIG. 12, to improve reliability of conduction between the shielding sheet 20 and the ground pin 11 in the foregoing embodiments. FIG. 13 is used as an example of an embodiment of the plurality of first conduction points 111 and the plurality of second conduction points 112. In addition, quantities of the first conduction points 111 and the second conduction points 112 may be the same or may be different. This is not particularly limited in the connector 100 in this application.

Figure 14:
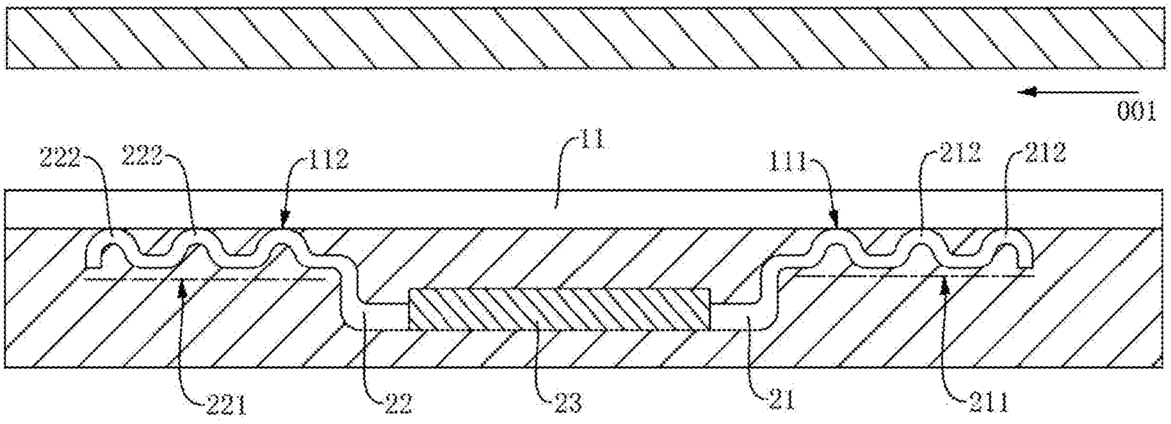
FIG. 14 is a partial cross-sectional schematic view of the connector according to FIG. 13 in another embodiment.

In an example in FIG. 14, the shielding sheet 20 is further embedded in the insulating substrate 33, that is, the shielding sheet 20 and the insulating substrate 33 are located on a same side of the ground pin 11. A plurality of first conduction points 111 and a plurality of second conduction points 112 are also formed between the shielding sheet 20 and the ground pin 11. In a structure shown in FIG. 14, because both the shielding sheet 20 and the ground pin 11 are fastened relative to the insulating substrate 33, relative positions of the shielding sheet 20 and the ground pin 11 can be further ensured.

In the example in FIG. 14, the connector 100 is further provided with a shielding cover 40. The shielding cover 40 is located on a side, of the transmission lines 10, facing away from the insulating substrate 33, and is also configured to implement shielding protection for the transmission lines 10. The shielding cover 40 is a metallic shielding cover, is fixedly disposed in the connector 100, and is spaced apart from each transmission line 10, so as to work together with the shielding sheet 20 in this application to perform shielding protection on the transmission lines 10 and prevent signal crosstalk. That is, a shielding measure of the connector 100 in this application for the transmission lines 10 is not limited to the shielding sheet 20, and another shielding measure that may achieve a shielding effect may also be applied to the connector 100 in this application to enhance shielding protection for the transmission lines 10.

Figure 15:
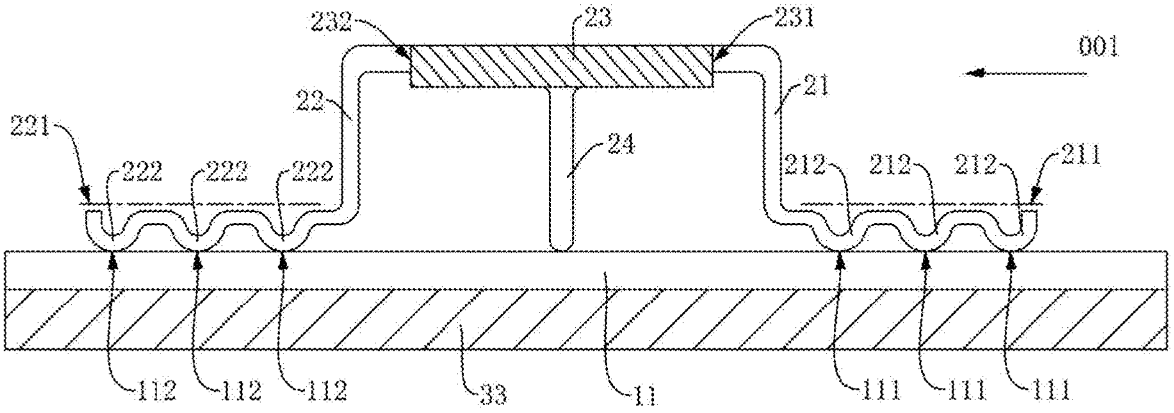
FIG. 15 is a partial cross-sectional schematic view of the connector according to FIG. 13 in still another embodiment.

For an embodiment, refer to FIG. 15. The shielding sheet 20 further includes a third support foot 24. The third support foot 24 is located between the first support foot 21 and the second support foot 22, and is also connected to the main body part 23. The third support foot 24 also extends toward the ground pin 11 from the main body part 23, and is electrically connected to the ground pin 11. With the third support foot 24 disposed, a current path is added between the main body part 23 and the ground pin 11. A current flowing from the first support foot 21 to the main body part 23 may further flow back to the ground pin 11 through the third support foot 24. Alternatively, a current may flow from the third support foot 24 to the main body part 23, and flow back to the ground pin 11 through the second support foot 22. In the foregoing two cases, an electrical signal current reference return distance between the ground pin 11 and the shielding sheet 20 is further shortened, that is, a length of an electrical path between the first conduction point 111 and the second conduction point 112 is reduced, so that an inductance effect that may be caused by the shielding sheet 20 to the transmission lines 10 can be further reduced.

Figure 16:
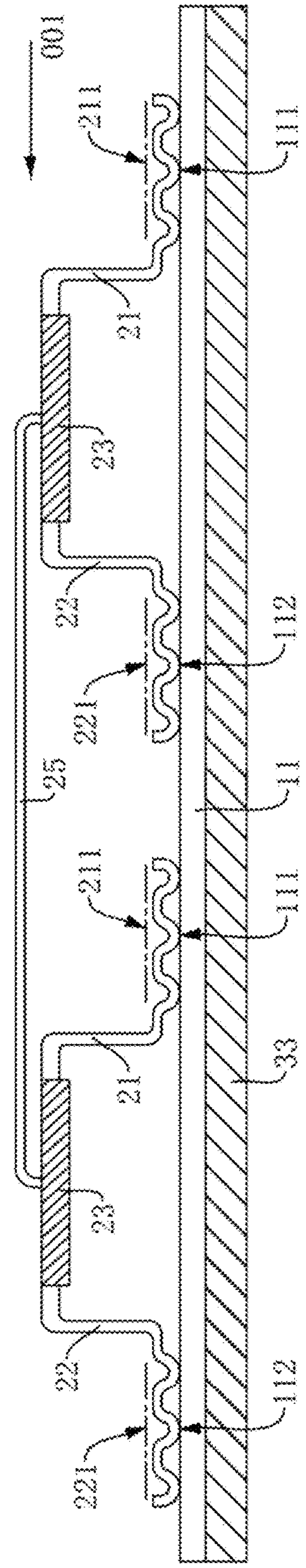
FIG. 16 is a partial cross-sectional schematic view of the connector according to FIG. 13 in yet another embodiment.

For an embodiment, refer to FIG. 16. The connector 100 in this application may be alternatively provided with a plurality of shielding sheets 20. The plurality of shielding sheets 20 are arranged at an interval along the extension direction of the ground pin 11 (that is, the transmission line 10). Each shielding sheet 20 is provided with a plurality of first support feet 21 and second support feet 22, and the first support foot 21 and the second support foot 22 are also electrically connected to the ground pin 11. In this embodiment, with the plurality of shielding sheets 20 disposed, a shielding protection effect of a larger area can be formed in the extension direction of the ground pin 11. In addition, a length of a single shielding sheet 20 may be set to be smaller, which helps reduce an inductance effect that may be caused by the single shielding sheet 20 to the transmission line 10.

Further, main body parts 23 of the plurality of shielding sheets 20 may be electrically connected to each other. In an example in FIG. 16, main body parts 23 of two shielding sheets 20 are connected to each other by using a conducting wire 25. Therefore, more electrical paths are formed between the first support foot 21 and the second support foot 22 of each of the two shielding sheets 20, so that generation of a signal current reference return phenomenon can be further prevented, thereby avoiding crosstalk resonance of a low-band signal. It can be understood that, in this embodiment, a quantity of conducting wires 25 is also the same as the quantity of ground pins 11, each conducting wire 25 is also disposed parallel to the extension direction of the ground pin 11, and a position of each conducting wire 25 is aligned with a corresponding ground pin 11 in a direction in which the plurality of transmission lines 10 are arranged side by side.

The foregoing descriptions are embodiments of this application, but are not intended to limit the protection scope of this application. Any variation or replacement, for example, reducing or adding a mechanical part, and changing a shape of a mechanical part, readily figured out by a person skilled in the art within the technical scope disclosed in this application shall fall within the protection scope of this application. When no conflict occurs, the embodiments of this application and the features in the embodiments may be mutually combined. Therefore, the protection scope of this application shall be subject to the protection scope of the claims.

What is claimed is:

1. A connector, comprising:

a plurality of transmission lines arranged at an interval in a first direction, wherein an extension direction of each of the plurality of transmission lines intersects the first direction, and the plurality of transmission lines comprise at least one ground pin; and a shielding sheet that is electrically conductive, the shielding sheet comprising:

a main body part extending along the first direction and spans the plurality of transmission lines from one side of the transmission lines to the other side of the transmission lines;

a first support foot;

a second support foot, wherein the first support foot and the second support foot are respectively disposed on two sides of the main body part, the first support foot is fastened to the at least one ground pin, the second support foot is also fastened to the at least one ground pin, and the main body part is spaced apart from the plurality of transmission lines; and a third support foot located between the first support foot and the second support foot and connected to the main body part.

2. The connector according to claim 1, wherein a quantity of first support feet, a quantity of second support feet, and a quantity of ground pins are the same, and each ground pin is electrically connected to one first support foot and one second support foot.

3. The connector according to claim 1, wherein each of the first support foot and the second support foot is disposed parallel to the extension direction of the transmission line.

4. The connector according to claim 1, wherein the plurality of transmission lines all extend along a second direction, and the second direction is perpendicular to the first direction.

5. The connector according to claim 1, wherein the plurality of transmission lines further comprise:

a plurality of signal pins, and the at least one ground pin comprising two side ground pins arranged at an interval, and wherein the plurality of signal pins are arranged between the two side ground pins.

6. The connector according to claim 5, wherein the at least one ground pin further comprises a plurality of intermediate ground pins arranged at an interval in the plurality of signal pins, and at least one signal pin is disposed between any two adjacent ones of the plurality of intermediate ground pins.

7. The connector according to claim 6, wherein the plurality of signal pins comprises a same quantity of signal pins between any two adjacent ones of the plurality of intermediate ground pins.

8. The connector according to claim 7, wherein the plurality of signal pins further comprises one or two signal pins between any two adjacent ones of the plurality of intermediate ground pins.

9. The connector according to claim 1, wherein a plurality of first conduction points are formed between the first support foot and the at least one ground pin, and the plurality of first conduction points are arranged at an interval along an extension direction of the at least one ground pin; and/or a plurality of second conduction points are formed between the second support foot and the at least one ground pin, and the plurality of second conduction points are arranged at an interval along the extension direction of the at least one ground pin.

10. The connector according to claim 1, further comprising a plurality of shielding sheets arranged at an interval along the extension direction of the transmission line.

11. The connector according to claim 10, wherein main body parts of the plurality of shielding sheets are electrically connected to each other.

12. The connector according to claim 1, wherein the third support foot is electrically connected to the at least one ground pin.

13. The connector according to claim 1, wherein the connector comprises an insulating base, and the plurality of transmission lines and the main body part of the shielding sheet are separately connected to the insulating base fixedly, so that the main body part and the plurality of transmission lines are fastened at an interval.

14. An electronic device, comprising:

two functional components, and a connector connecting the two functional components, wherein the connector comprises:

a plurality of transmission lines arranged at an interval in a first direction, wherein an extension direction of each of the plurality of transmission lines intersects the first direction, and the plurality of transmission lines comprise at least one ground pin; and a shielding sheet that is electrically conductive, the shielding sheet comprising:

a main body part extending along the first direction and spans the plurality of transmission lines from one side of the transmission lines to the other side of the transmission lines;

a first support foot, a second support foot, wherein the first support foot and the second support foot are respectively disposed on two sides of the main body part, the first support foot is fastened to the at least one ground pin, the second support foot is also fastened to the at least one ground pin, and the main body part is spaced apart from the plurality of transmission lines; and a third support foot located between the first support foot and the second support foot and connected to the main body part.

15. The electronic device of claim 14, wherein a quantity of first support feet, a quantity of second support feet, and a quantity of ground pins are the same, and each ground pin is electrically connected to one first support foot and one second support foot.

16. The electronic device of claim 14, wherein each of the first support foot and the second support foot is disposed parallel to the extension direction of the transmission line.

17. The electronic device of claim 14, wherein the plurality of transmission lines all extend along a second direction, and the second direction is perpendicular to the first direction.

18. The electronic device of claim 14, wherein the plurality of transmission lines further comprise:

a plurality of signal pins, and the at least one ground pin comprising two side ground pins arranged at an interval, and wherein the plurality of signal pins are arranged between the two side ground pins.

19. The electronic device of claim 18, wherein the at least one ground pin further comprises a plurality of intermediate ground pins arranged at an interval in the plurality of signal pins, and at least one signal pin is disposed between any two adjacent ones of the plurality of intermediate ground pins.

20. The electronic device of claim 14, wherein a plurality of first conduction points are formed between the first support foot and the at least one ground pin, and the plurality of first conduction points are arranged at an interval along an extension direction of the at least one ground pin; or a plurality of second conduction points are formed between the second support foot and the at least one ground pin, and the plurality of second conduction points are arranged at an interval along the extension direction of the at least one ground pin.

* * * * *